United States Patent Office 2,924,951
Patented Feb. 16, 1960

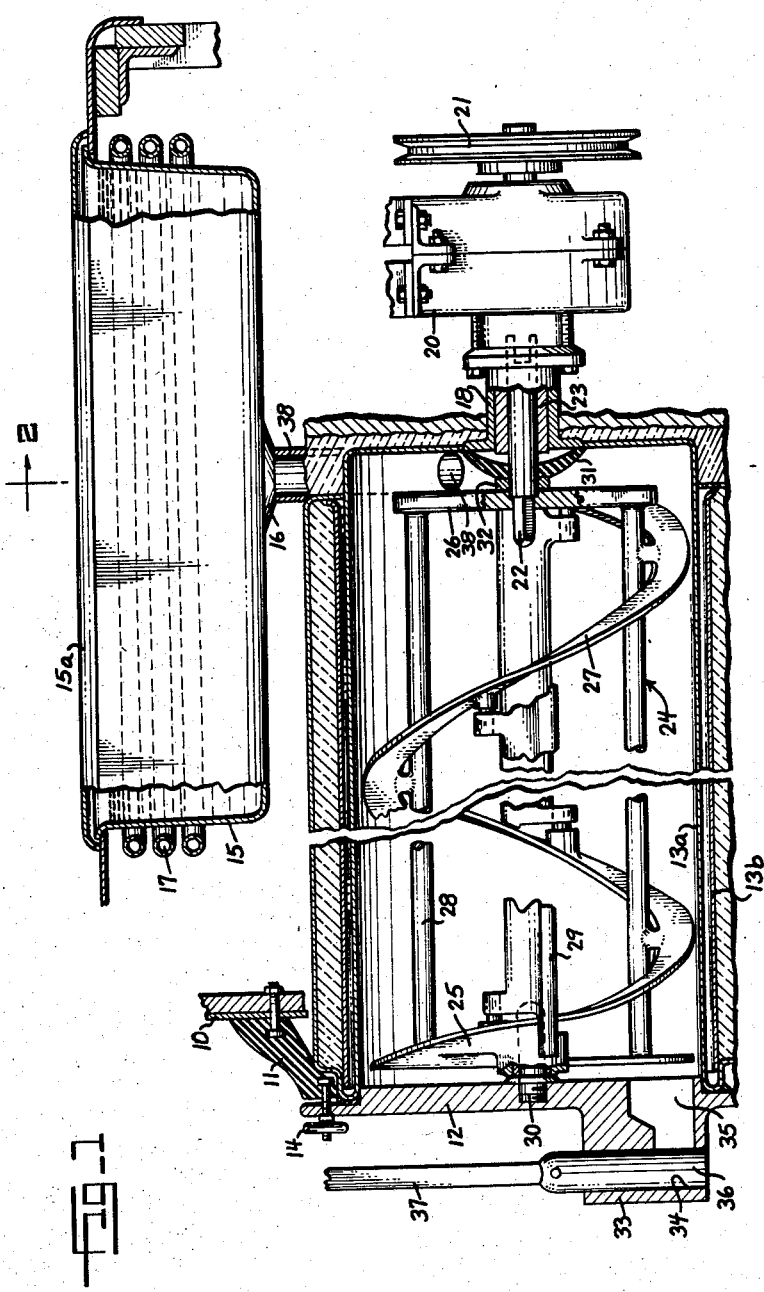

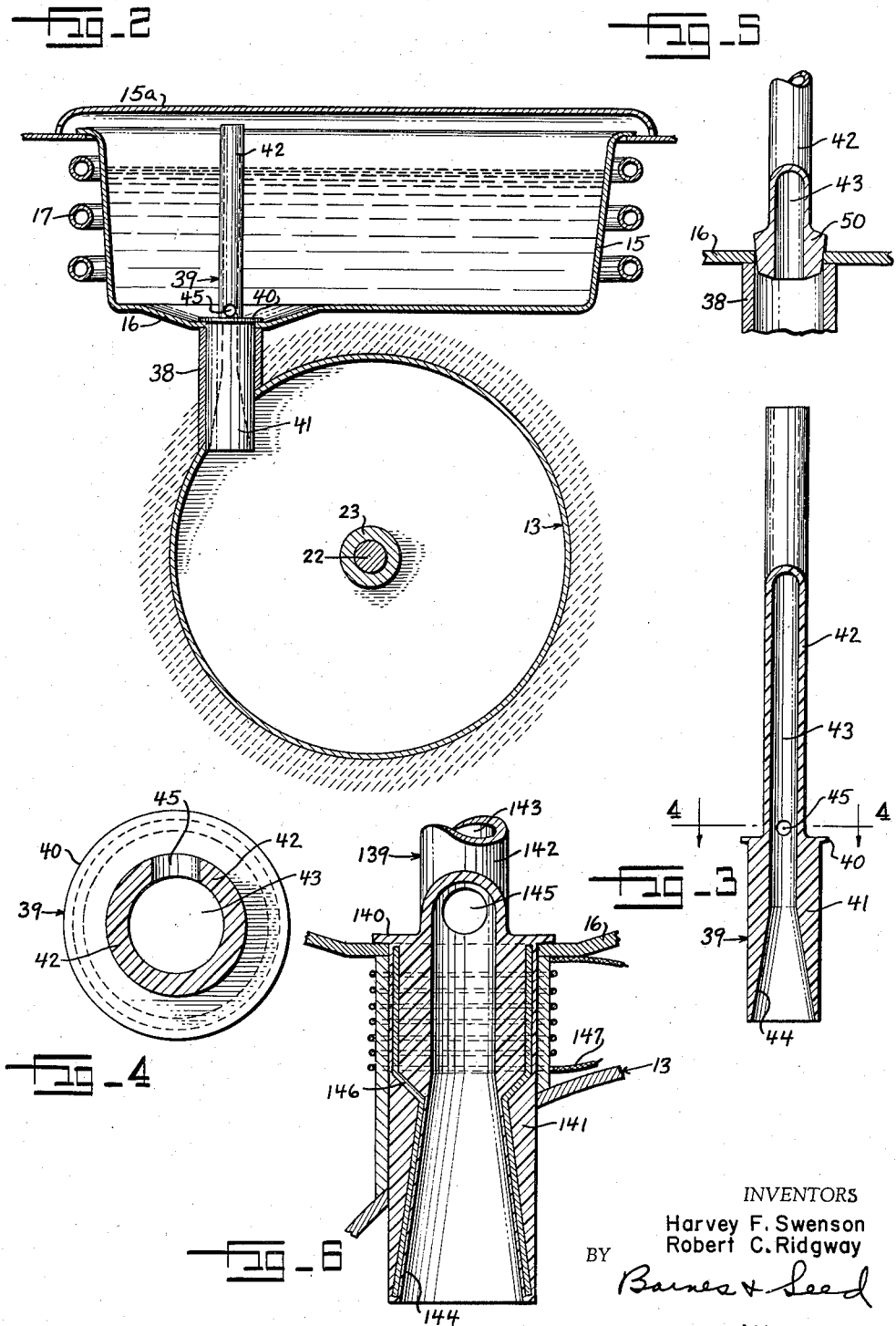

2,924,951

MIX-AND-AIR FEEDING DEVICE FOR DISPENSING FREEZERS

Harvey F. Swenson and Robert C. Ridgway, Seattle, Wash.

Application May 27, 1957, Serial No. 661,716

7 Claims. (Cl. 62—304)

This invention relates to an improved device for feeding mix and air to freezers which operate to produce and dispense frozen mix-and-air products, such, for example, as "soft" ice-cream. In freezers of this type the freezing cylinder in which the product is produced has an admission opening for periodic introduction of mix and an outlet opening through which the frozen product is dispensed. The freezing head which contains the cylinder is connected in a refrigeration circuit which includes a motor-driven compressor, and within the cylinder there is provided a dasher, also motor-driven, which operates during the freezing action to whip air into the mix so as to give the product the proper consistency. The dasher also urges the frozen product toward the dispensing opening and consequently is activated during each successively performed dispensing operation.

It is the principal object of the present invention to provide an improved feeding device by which charges of mix and air are fed to the freezing cylinder automatically from a mix tank and the atmosphere, respectively, as each of a succession of servings of frozen product are made, the effective volume of each such charge being only so large as is necessary to replenish the product dispensed, and hence making the freezer a "continuous operation" unit in the sense that, throughout a business day, it is never necessary to hold the machine out of use once an original batch has been brought to serving condition.

A further object is to provide such a mix feeding device which admits of having all of its surfaces which come into contact with the mix or frozen product thoroughly cleaned, and wherein such cleaning can be performed with ease and expedition.

Furthermore, the invention aims to provide an improved mix-and-air feeding device which is of simple and economical construction and has no moving parts during operation.

With yet additional objects and advantages in view which, with the foregoing, will appear and be understood in the course of the following description and claims, the invention consists in the novel construction and in the adaptation and combination of parts hereinafter described and claimed.

In the accompanying drawings:

Figure 1 is a fragmentary longitudinal vertical sectional view of a freezer adapted to receive our mix-and-air feeding device.

Fig. 2 is a fragmentary transverse vertical sectional view drawn to a larger scale on line 2—2 of Fig. 1 and showing our feeding device in operative position.

Fig. 3 is a longitudinal vertical sectional view of the feeding device to a yet larger scale.

Fig. 4 is a transverse sectional view taken to an enlarged scale along line 4—4 of Fig. 3.

Fig. 5 is a fragmentary detail view, partly in vertical section and to the same scale as Fig. 3, illustrating the use of a modified feeding device provided with a stopper at its upper end; and Fig. 6 is a sectional view taken similarly to Fig. 2 and illustrating a modified feeding device in operative position.

The freezer to which the present invention is illustrated as applied is housed in a cabinet whose front wall 10 provides a circular opening circumscribed by a fixedly secured insulating collar 11. A removable front 12 for the unit's freezing cylinder 13 is held against the collar by thumb screws 14. In the top wall of the cabinet there is provided a relatively large opening, and set into this opening is a tank 15 for the mix, such tank having a removable cover 15a and a dished floor well 16 providing an outlet. The recess in which the tank is received is surrounded by an insulated jacket, and within the jacket in direct contact with the inner shell thereof is a cooling coil 17. Refrigerant gas, preferably Freon, after having previously performed a primary refrigerating function for the freezing cylinder, is fed in a moderately cold condition to and from said cooling coil.

The freezing cylinder is a hollow-walled structure composed of spaced inner and outer shells 13a, 13b joined at the ends by weld seams. At the back there is provided a rearwardly extending tubular prolongation 18, and this prolongation derives support from a gear box 20 mounted in the cabinet. Reduction gears contained in the gear box are powered by a pulley 21 driven by a belt from an electric motor. Driven off the output end of the gear box is a jack-shaft 22 which projects into the cylinder and takes a journal in a bushing 23. A dasher 24 provides headers 25 and 26 at its front and rear ends, respectively, between which extend a helically developed dasher blade 27 and alternating pairs of stay rods 28 and scraper blades 29. The front header is auger-like and has a round center opening into which there is received a journal pin 30 carried by the freezer front 12 while the rear header presents a squared center socket into which the front end of the jack-shaft 22 fits.

Designated by 31 is a seal which surrounds the jack-shaft, and by means of an intervening friction washer 32 this seal is tensioned by the dasher so as to bear tightly against the front face of the cylinder's rear wall. The seal is comprised of a generally cone-shaped body of elastic rubber, so made that end force transmitted from the freezer front to the dasher causes the rubber body to be distorted and its rim stretched to torsion said rim against the back wall of the cylinder.

The freezer front 12 presents a forwardly projecting nose 33 in which there is provided a vertical through-bore 34, and leading into this bore from the front end of the freezer cylinder is a feed passage 35. A solid cylindrical plunger valve 36, functioning as a serving gate, is journaled for endwise sliding movement in said bore from a lower closed position to an upper open position whereat the frozen product within the freezer cylinder is enabled to be dispensed. The gate, which is relatively heavy so as to move by gravity into closed position, may be solenoid-raised into open position or may also be opened by hand. For this latter purpose there is provided an arm 37 projecting laterally from the upper exposed end of the gate.

It will be noted that the inner shell 13a of the freezing cylinder 13 extends rearwardly beyond the outer shell and the rear header 26 and is provided with an upwardly extending feed neck 38 which is offset with respect to the longitudinal axis of the cylinder. This feed neck connects at its upper end to the mix tank well 16 to receive our feeding device and the fact that it is in a non-refrigerated portion of the freezing cylinder and rearwardly of the dasher is important in helping to prevent the lower ends of the feeding device from becoming clogged by frozen product.

Our feeding device illustrated in Figs. 2–4, designated 39, may be of one-piece construction, formed, for example, by a plastic molding operation, and has a central annular flange 40 for seating in the well 16 to seal the rim of the mix tank outlet. To aid in the performance of this sealing function, the underside of the flange may be somewhat beveled. Depending from the flange 40 is a lower tubular section 41 which extends through the feed neck 38, but preferably, only about as far as shown in Fig. 2. An upper tubular section or stem 42, which may be smaller in outside diameter than the lower section 41, extends upwardly, from flange 40 above the upper level limit of the mix in the tank 15 so that its upper end will serve as an air intake. It will be noted that a longitudinal central bore 43 of substantially constant diameter extends the full length of the stem 42 and into the lower section 41 from whence it flares outwardly to provide a beveled outlet portion 44.

Closely above the flange 40 there is provided an orifice or port 45 in the stem 42 for connecting the bore 43 with the interior of the mix tank 15. This port is purposely smaller in area than the bore 43 so as to limit the flow of mix from the tank relative to the downward flow of air in the stem 42.

To initially charge the freezing cylinder 13 it is only necessary to fill the mix tank 15 and start the machine so as to refrigerate the cylinder and coincidently turn the dasher 24. Mix from the tank will flow through the port 45 and down into the freezing cylinder while, at the same time, the cylinder has communication with the atmosphere by the upper end of the stem 42. The construction of the dasher is such that it whips air into the mix as the latter is being frozen, and at the same time pushes the mix forwardly within the cylinder, creating an internal pressure. By the action of the dasher, a front-end portion of the cylinder comprehending well in excess of one-half the overall length will become filled with the frozen product when the latter reaches serving consistency. Within the remaining rear-end portion of the cylinder the profile configuration of the product, considered in longitudinal vertical section, will suggest a wave, being flush with or moderately above the lower end of the feeding device 39 at the rear end of the cylinder and thence rising rather steeply in an upward sweep, much in the nature of a sinusoid curve, merging with the ceiling line of the cylinder at a point spaced somewhat to the front of the supply pipe. In this regard, it will be noted from Fig. 2 that since the feed neck 38 of the freezing cylinder is laterally offset relative to the longitudinal center axis of the cylinder, the lower end of the feed neck is spaced below the top level of the cylinder. Thus, even though the lower section 41 of the feeding device may in some equipment purposely extend only slightly into the freezing cylinder the lower end of such section can become closed by mix in the cylinder without necessitating that the rear end portion of the cylinder be completely full of mix. As a result, adequate space for air is assured in the freezing cylinder.

The bore 43 of the feeding device will contain mix up to the level of the mix in the tank 15 when the freezing cylinder becomes fully charged with frozen product, but this mix is precluded from entering the freezing cylinder as long as the charge of mix within the latter is flush with or above the lower end of the feeding device. While a serving of frozen product is dispensed, the dasher 24 is in operation to force it toward the freezer outlet 35, and hence, as a result, the lower end of the feeding device becomes exposed and the pressure within the cylinder drops proportionately with the amount of product dispensed. Thereupon a replacement of fresh mix automatically flows through the feeding device into the freezing cylinder. This replacement is initially a charge of mix alone to clear the bore 43, followed by a later volume of a blend of air and mix, the air entering the stem through its open upper end and the mix entering through the port 45.

It should be here pointed out that the liquid capacity of the bore 43 is little more than half an ounce, hence assuring the desired over-run of air.

From time to time the frozen product will be pushed up into the feeding device. However, the beveled outlet portion 44 of the bore assures that any such frozen product will readily free itself at the start of a mix-and-air feeding operation.

The feeding device 39 has freezing temperature limitations, and hence we have shown in Fig. 6 a modified feeding device 139 having heating provisions which permit it to be used in a colder freezing range. This modified device has a central flange 140, a depending lower tubular section 141, an upwardly extending hollow stem 142, and a longitudinal center bore 143 with a lower beveled portion 144, all corresponding in general shape and function to the like named parts of the device 39. However, it will be noted that the lower section 141 is molded with a core 146 of aluminum or some other material of relatively high thermal conductivity whereas the lower section proper should be formed from a material of relatively low thermal conductivity such as a suitable plastic. The core 146 should be close to the external surface of the lower section 141 in the region surrounded by the feed neck 38 and close to the interior surface of the beveled outlet portion 144 of the bore 143.

In the modified version, it should be noted that the feed neck 38 is wound with an electrical heating coil 147 or subjected to some other suitable source of heat, and hence should have good thermal conductivity so that the heat from the coil will be efficiently conducted to the lower section 141. With the thermally conductive core 146 close to the exterior surface of the lower section within the feed neck, heat is transmitted through the skin of the lower section from the heated feed neck and thence is conducted by the core to warm the skin of the beveled outlet portion 144 of the bore. There is no intention that the outer surface of the part of the lower section 141 within the freezing cylinder be warmed, and in fact, the thermal insulating effect of the feeding device material external of the core portion surrounding the beveled portion 144 is purposed to cause a concentration of the administered heat on the inner surface of such part.

Our modified feeding device, also has an orifice or port 145 in the stem 142 closely above the central flange 140 for connecting the bore 143 with the mix tank 15. As before, this port is intentionally smaller in area than the bore so as to limit the flow of mix from the tank relative to the downward flow of air in the stem 142 entering through the latter's open upper end. The mix-and-air feeding operation of the modified device 139 is the same as that heretofore described.

During cleaning or other operations it may be desirable from time to time for the machine operator to be able to shut off the flow of mix from the tank 15 to the freezing cylinder 13. For this purpose the upper end of the stem 42 or 142 may be formed with a hollow conical stopper 50 of a size adapted to fit into the tank outlet in the floor of the well 16. Thus, all the operator has to do in order to stop the flow of mix is to withdraw the feeding device from the feed neck 38, quickly turn the device end-for-end and lower it until the stopper 50 seats on the rim of the tank outlet as shown in Fig. 5.

Cleaning of my feeding devices can be readily accomplished after lifting the device free of the feed neck 38 and mix tank 15. With the feeding device removed, scouring and rinsing solutions can be circulated from the mix tank through the feed neck into the freezing cylinder to thoroughly clean the inside of the machine.

It is thought that the invention will have been clearly understood from the foregoing detailed description of our now preferred illustrated embodiment. Changes within the spirit of our teachings may be resorted to without departing from the invention and it is accordingly our intention that the hereto annexed claims be given a scope in their construction fully commensurate with the broadest interpretation to which the employed language admits.

What we claim is:

1. In a mix-and-air feeding system, a freezing cylinder having a radially facing inlet at its rear end laterally offset relative to the longitudinal center axis of the cylinder for the entry of air and liquid mix and having an outlet at its front end for discharging a frozen mixture of air and mix, the portion of said cylinder from in front of said inlet rearwardly being free of direct refrigeration, dasher means journal-mounted for rotation in said cylinder and arranged to work forwardly of said inlet and adapted to urge said frozen mixture forwardly toward said outlet, a liquid mix tank above said freezing cylinder and having an egress opening overlying said freezing cylinder inlet, and an open-ended tubular device having an annular downwardly facing shoulder intermediate its ends seating on the rim of said egress opening with the lower end of the device depending to said freezing cylinder inlet and the upper end of the device extending above the mix in the tank to serve as an air inlet, said device having a mix port therethrough which is located within said tank closely above said shoulder and has an area smaller than the minimum interior cross-sectional area of the device.

2. For a mix-and-air feeding system, a feeding device comprising, an open-ended tubular device having an annular downwardly facing shoulder intermediate its ends adapted to seat on the rim of an outlet opening in the bottom of a mix tank with the upper end of the device extending above the mix in the tank to serve as an air inlet, said device having a mix port therethrough which is located closely above said shoulder and has an area smaller than the minimum interior cross-sectional area of the device, and the terminal lower end portion of said device being internally flared below said shoulder to ease release of foreign material therein.

3. For a mix-and-air feeding system, a feeding device comprising, an open-ended tubular device having an annular downwardly facing shoulder intermediate its ends adapted to seat on the rim of an outlet opening in the bottom of a mix tank with the upper end of the device extending above the mix in the tank to serve as an air inlet, said device having a mix port therethrough which is located closely above said shoulder and has an area smaller than the minimum interior cross-sectional area of the device, and said device having a thermally conductive core which has an upper portion close to the outer surface of the device adjacent said shoulder and which has a lower portion close to the inner surface of said device near its lower end, said core having greater thermal conductivity than the device proper.

4. The combination of claim 3 in which said lower portion of the core is closer to the inner surface of said device than the exterior surface thereof.

5. The combination of claim 4 in which said upper portion of the core is closer to the exterior surface of said device than the inner surface thereof.

6. For a mix-and-air feeding system, an open-ended tubular feeding device having an annular exterior enlargement intermediate its ends adapted to seat on the rim of an outlet opening in the bottom of a mix tank with the upper end of the device extending above the mix in the tank to serve as an air inlet, said device having a mix port closely above said enlargement, and a thermally conductive core embedded in said device below said enlargement and having greater thermal conductivity than the device proper.

7. For a mix-and-air feeding system, a feeding device comprising, an open-ended tubular device having an externally enlarged lower portion and an externally reduced upper portion joining at an outwardly projecting annular flange adapted to seat on the rim of an outlet opening in the bottom of a mix tank with said reduced upper portion extending above the mix in the tank to serve as an air inlet, said reduced upper portion having a mix opening therethrough adjacent to said flange and smaller in area than the minimum interior cross-sectional area of the device and said enlarged lower portion being internally flared toward the lower end, the internal flare of said enlarged lower portion reaching a diameter greater than the external diameter of the greater part of the length of said reduced upper portion.

References Cited in the file of this patent

UNITED STATES PATENTS

| | | |
|---|---|---|
| 336,306 | Fletcher | Feb. 16, 1886 |
| 822,854 | Cosgrave | June 5, 1906 |
| 1,422,768 | Kent et al. | July 11, 1922 |
| 1,482,175 | Wilson | Jan. 29, 1924 |
| 1,538,102 | Fair | May 19, 1925 |
| 2,302,169 | Baker | Nov. 17, 1942 |
| 2,435,033 | Campbell | Jan. 27, 1948 |
| 2,522,651 | Van Vleck | Sept. 19, 1950 |
| 2,705,620 | Borck | Apr. 5, 1955 |
| 2,717,772 | Palivos | Sept. 13, 1955 |
| 2,737,024 | Swenson | Mar. 6, 1956 |
| 2,770,319 | Hagenbook | Nov. 13, 1956 |
| 2,785,836 | Smith et al. | Mar. 19, 1957 |

FOREIGN PATENTS

| | | |
|---|---|---|
| 810,207 | France | Dec. 19, 1936 |
| 888,247 | France | Aug. 30, 1943 |